(12) United States Patent
Velusamy et al.

(10) Patent No.: US 9,344,933 B1
(45) Date of Patent: May 17, 2016

(54) MOBILITY MANAGEMENT ENTITY (MME) SYSTEM AND METHOD TO DISABLE VOICE OVER LTE (VOLTE) SERVICE OF A LONG TERM EVOLUTION (LTE) BASE STATION

(71) Applicant: Sprint Communications Company L.P., Overland Park, KS (US)

(72) Inventors: Saravana Velusamy, Olathe, KS (US); Deveshkumar Narendrapratap Rai, Overland Park, KS (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 163 days.

(21) Appl. No.: 14/249,720

(22) Filed: Apr. 10, 2014

(51) Int. Cl.
*H04W 36/00* (2009.01)
*H04W 8/08* (2009.01)
*H04W 88/06* (2009.01)

(52) U.S. Cl.
CPC ............ *H04W 36/0094* (2013.01); *H04W 8/08* (2013.01); *H04W 36/0022* (2013.01); *H04W 88/06* (2013.01)

(58) Field of Classification Search
None
See application file for complete search history.

(56) References Cited

U.S. PATENT DOCUMENTS

| 8,599,765 | B2 * | 12/2013 | Zhao | H04W 60/06 370/328 |
|---|---|---|---|---|
| 2012/0008592 | A1 * | 1/2012 | Thomas | H04W 36/0022 370/331 |
| 2013/0315072 | A1 | 11/2013 | Hietalahti et al. | |
| 2014/0064156 | A1 * | 3/2014 | Paladugu | H04W 36/0022 370/259 |
| 2014/0078898 | A1 * | 3/2014 | Anchan | H04W 28/0268 370/230 |
| 2014/0099966 | A1 * | 4/2014 | Hori | H04W 76/041 455/450 |
| 2015/0003411 | A1 * | 1/2015 | Sandhu | H04W 36/0022 370/331 |
| 2015/0181416 | A1 * | 6/2015 | Dominguez Romero | H04W 8/22 370/328 |
| 2015/0264707 | A1 * | 9/2015 | Golderer | H04W 72/087 370/329 |
| 2015/0282011 | A1 * | 10/2015 | Watfa | H04W 36/0022 370/332 |

FOREIGN PATENT DOCUMENTS

WO   WO 2015/070420 A1 * 11/2013 ............ H04W 36/14

* cited by examiner

*Primary Examiner* — Kodzovi Acolatse

(57) ABSTRACT

A Mobility Management Entity (MME) system and method to disable Voice over LTE (VoLTE) service of a Long Term Evolution (LTE) base station (BS) are provided. The MME system in one example includes a data communication interface configured to receive VoLTE performance metrics and transmit and receive signaling messages over a communication network and a processing system configured to process VoLTE performance metrics obtained through the data communication interface to determine if VoLTE service on the LTE BS should be disabled, and if VoLTE should be disabled and if a create bearer request obtained through the data communication interface has a Quality-of-Service Class Identifier (QCI) value indicating a VoLTE session for a UE, transfer a reject message for delivery to the UE instructing the UE to use a different BS for voice service.

20 Claims, 6 Drawing Sheets

MOBILITY MANAGEMENT ENTITY (MME) SYSTEM AND METHOD TO DISABLE VOICE OVER LTE (VOLTE) SERVICE OF A LONG TERM EVOLUTION (LTE) BASE STATION

TECHNICAL BACKGROUND

The Long Term Evolution (LTE) wireless communication protocol was developed as a wireless data communication protocol for Internet Protocol (IP) communications, such as for data communications in cellular telephone networks. The LTE wireless communication protocol comprises a packetized communication protocol, wherein an IP session is set up for each device accessing a wireless communication system. The LTE wireless communication protocol efficiently employs communication bandwidth for data communication by multiplexing Resource Blocks (RBs) in both the time domain and frequency domain.

The Voice over LTE (VoLTE) wireless communication protocol was developed to provide packetized voice communications capability over IP networks, with LTE and VoLTE therefore capable of carrying voice and data communications.

In operation, in order to wirelessly link with a LTE Base Station (BS), a wireless User Equipment (UE) registers with the LTE BS, wherein the LTE BS serves as the access point into a wireless communication system for the UE. The UE can register with the LTE BS when the UE is powered-on or when the UE moves into a coverage area of the LTE BS, for example.

When the UE registers with the LTE BS, several operations generally occur. The wireless communication system determines if the UE is in-network or out-of-network (i.e., whether the UE is roaming). The wireless communication system verifies that the UE is authorized and that the subscriber account for the UE is paid up and is not restricted. The wireless communication system then determines what communication services the UE can access.

The wireless communication network first sets up an Internet default bearer for the UE. The UE can initiate data communications over the Internet default bearer. Then the wireless communication network sets up a VoLTE default bearer for the UE. The UE can initiate voice communications over the VoLTE default bearer. The UE can now initiate or receive data communications and voice calls through the wireless communication network.

The LTE wireless communication protocol provides a Quality-of-Service (QoS) for a given communication application by selecting an appropriate communication bearer as given by a QoS Class Identifier (QCI) value. Each bearer has an associated QCI value. The QCI value is a scalar value that denotes a specific packet-forwarding behavior to be provided by the selected communication bearer. The QCI value specifies communication characteristics such as resource types, priority levels, packet delay budgets, and packet error loss rates. The QCI value therefore determines the bandwidth, priority, and other resources to be provided to a communication bearer.

Each QCI value is associated with a specific communication level or type. QCI values 1-4 comprise Guaranteed Bit Rate (BBR) communication bearers, while the QCI values 5-9 comprise non-GBR communication bearers. The GBR QCI communication bearers are used for voice communications and live streaming video, for example. Voice calls typically are associated with higher priorities and more demanding error condition performance than data communications, due to the importance of receive voice call RBs substantially in real-time and in the original transmission order. As a consequence, transmission/reception conditions at the LTE BS that are acceptable for data communications may not be acceptable for VoLTE voice calls.

Overview

A Mobility Management Entity (MME) system and method to disable Voice over LTE (VoLTE) service of a Long Term Evolution (LTE) base station (BS) are provided. The MME system in one example includes a data communication interface configured to receive VoLTE performance metrics and transmit and receive signaling messages over a communication network and a processing system configured to process VoLTE performance metrics obtained through the data communication interface to determine if VoLTE service on the LTE BS should be disabled, and if VoLTE should be disabled and if a create bearer request obtained through the data communication interface has a Quality-of-Service Class Identifier (QCI) value indicating a VoLTE session for a UE, transfer a reject message for delivery to the UE instructing the UE to use a different BS for voice service.

DETAILED DESCRIPTION

Figure 1:
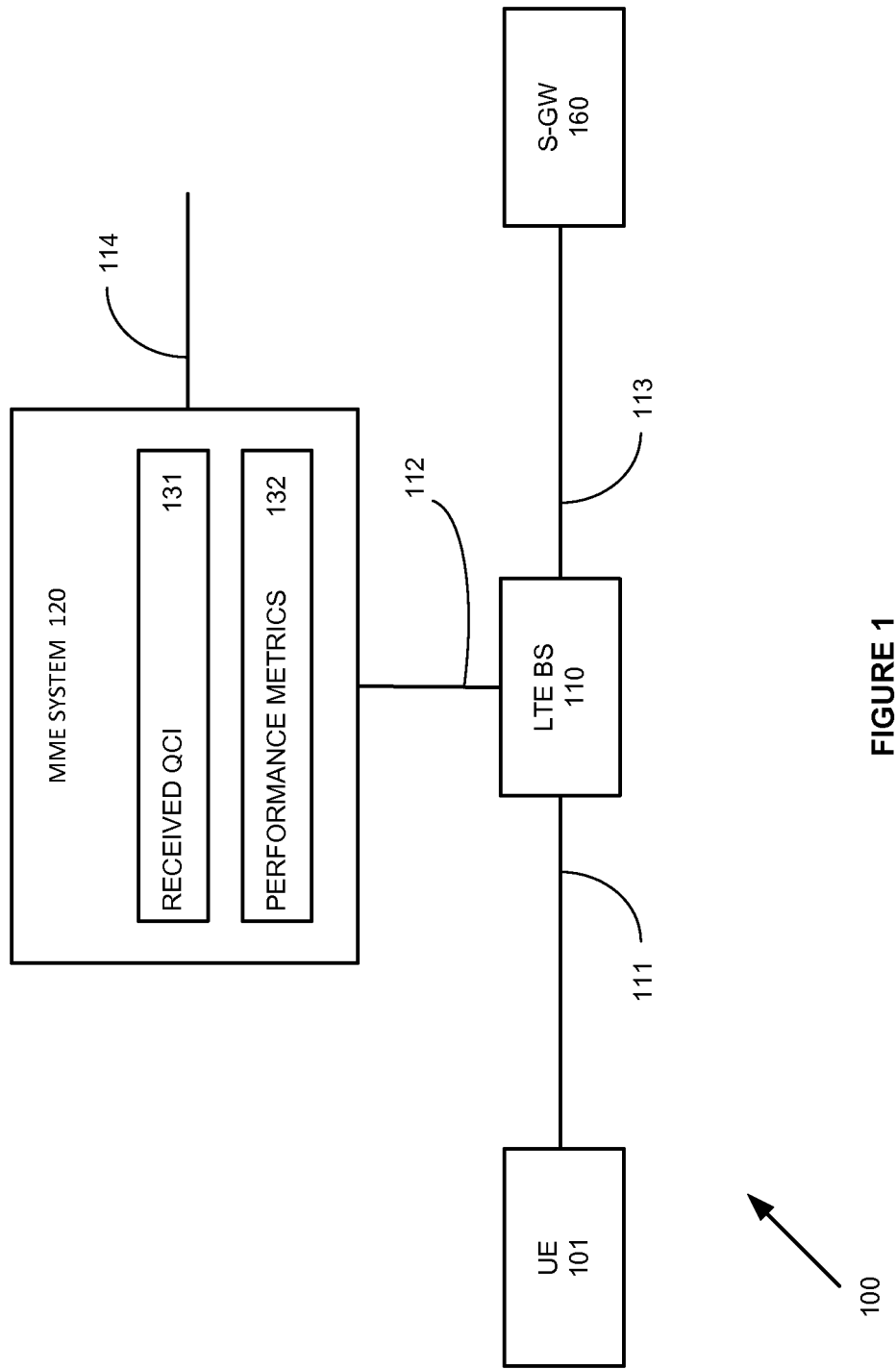
FIG. 1 illustrates a Mobility Management Entity (MME) system to disable Voice over LTE (VoLTE) service of a Base Station (BS).

FIG. 1 illustrates a Mobility Management Entity (MME) system 120 to disable Voice over LTE (VoLTE) service of a LTE Base Station (BS) 110. The MME system 120 is a component of or interacts with a wireless communication system 100. The wireless communication system 100 further includes the LTE BS 110 coupled to the MME system 120 and a Serving Gateway (S-GW) 160 coupled to the LTE BS 110. The LTE BS 110 comprises a Long Term Evolution (LTE) BS or includes a LTS BS capability. In some examples the LTE BS 110 comprises an evolved Node B (eNB) 110. It should be understood that the wireless communication system 100 can include further components that are not shown for clarity.

The MME system 120 is coupled to the LTE BS 110 by a S1 signaling link 112. The S-GW 160 is coupled to the LTE BS 110 by a S1 signaling link 113. The MME system 120 in some examples is coupled to other communication network components of the communication network 100 by a link 114. For example, the MME system 120 consults a Home Subscriber System (HSS) during a UE registration.

The links 111-114 comprise metal, glass, plastic, air, space, and the like. The links 111-114 propagate electromagnetic signals that utilize various protocols, such as LTE, Internet Protocol (IP), Ethernet, Session Initiation Protocol (SIP), Diameter, Real-time Transfer Protocol (RTP), and/or some other format—including combinations thereof. The links 111-114 may include intermediate devices, systems, and networks.

A User Equipment (UE) 101 can link to and communicate with the LTE BS 110 via a wireless link 111. The UE 101 could be a telephone, computer, media player, gaming apparatus, internet appliance, or some other machine capable of interfacing with LTE and IMS systems. UE 101 comprises computer and communication circuitry, data memory, and associated software/hardware components. The UE 101 can exchange voice communications with the LTE BS 110 via the wireless link 111. The UE 101 can exchange data communications with the LTE BS 110 via the wireless link 111.

The UE 101 is registered to the LTE BS 110. As part of the registration process, a default Internet bearer is set up for the UE 101. The default Internet bearer includes an associated IP address. The default Internet bearer can be used for exchanging data communications. The default Internet bearer will remain for as long as the UE 101 remains attached to the wireless communication network 100.

In addition, after the default Internet bearer is set up, a default VoLTE bearer is set up for the UE 101 (the UE 101 can receive multiple default bearers). The default VoLTE bearer can be used for exchanging VoLTE voice calls. The default VoLTE bearer is set-up and maintained until needed.

Typically, a LTE network including VoLTE capabilities establishes two default bearers and one dedicated bearer. A first default bearer comprises a data communications bearer and can be used for video, chat, email communications, browser communications, and more. A second default bearer (i.e., a default VoLTE bearer in this example) is used for transferring Session Initiation Protocol (SIP) signaling messages related to an IMS system or network. The second default bearer uses a QCI value of five.

A dedicated VoLTE bearer is generally established for transferring VoLTE voice communications. A dedicated VoLTE bearer is established when there is a need to provide QoS to a specific communication service. The dedicated VoLTE bearer uses a QCI value of one. The dedicated VoLTE bearer is linked to the default VoLTE bearer. The default VoLTE bearer carries signaling traffic for the dedicated VoLTE bearer, where the default VoLTE bearer is created for communicating with an IMS system or network.

The MME system 120 receives performance metrics 122 from the LTE BS 110. The performance metrics 122 are received substantially periodically in one example. Alternatively, the performance metrics 122 can be received irregularly, such as when there is a change in the performance metrics 122. The MME system 120 processes the performance metrics 122. As a result, the MME system 120 determines whether the LTE BS 110 is operating within acceptable parameters. The MME system 120 determines whether the LTE BS 110 is operating within acceptable parameters for conducting VoLTE voice calls.

The MME system 120 receives a QCI value 121 for communications to be exchanged between the UE 101 and the wireless communication system 100, including a QCI for the default VoLTE bearer. Typically, a default bearer is assigned a QCI value in the 5-9 range. The MME system 120 is configured to determine whether the received QCI 121 for a particular communication comprises a QCI value corresponding to a VoLTE call initiated by the UE 101. If the received QCI 121 is a value of one, then the corresponding communication comprises a VoLTE call. If the received QCI 121 is a value of one, then the MME system 120 must verify whether the LTE BS 110 has adequate performance to handle a VoLTE call.

In some examples, the MME system 120 is configured to receive VoLTE performance metrics 122 that characterize VoLTE quality of the LTE BS 110, process the VoLTE performance metrics 122 to determine if the VoLTE service on the LTE BS 110 should be disabled, receive a create bearer request for a User Equipment (UE) 101 transferred by a Serving Gateway (S-GW) 160 and comprising a Quality-of-Service Class Identifier (QCI) value 121, and if the VoLTE service on the LTE BS 110 should be disabled and if the QCI value 121 indicates a VoLTE session, then transfer a reject message for delivery to the UE 101 instructing the UE 101 to use a different BS for voice service. The reject message disables VoLTE for the LTE BS at the current time.

In some examples, the MME system 120 initiates a circuit Switched Fall Back (CSFB) procedure. The MME system 120 in some examples routes the call to a CDMA voice communication system or other suitable non-VoLTE communication system or communication system component.

In some examples, the LTE BS 110 includes multiple radio frequency bands that can be used for exchanging communications, wherein some or all of the radio frequency bands can be checked for suitability for VoLTE communications. The MME system 120 processes the available radio frequency bands of the LTES BS 110 to determine if any of the available radio frequency bands can be used for VoLTE communications, wherein the reject message is sent only if all available radio frequency bands of the LTE BS 110 are not suitable. In this example, processing the VoLTE performance metrics 122 comprises processing the VoLTE performance metrics 122 for a plurality of radio frequency bands to determine if the VoLTE service on one of the radio frequency bands on the LTE BS 110 should be disabled, and transferring the reject message comprises transferring the reject message if the VoLTE service on the one of the radio frequency bands on the LTE BS 110 should be disabled, if the QCI indicates a VoLTE session, and if the VoLTE session is on the one of the radio frequency bands.

In some examples, the reject message comprises part of a Single Radio Voice Call Continuity (SRVCC) procedure. SRVCC refers to the voice call continuity between IMS over packet-switched access and circuit-switched access for calls that are anchored in IMS when the UE is capable of transmitting or receiving on only one of those access networks at a given time. The MME system 120, when the LTE BS 110 cannot (or should not) perform the VoLTE call, is capable of triggering the SRVCC procedure. The MME system 120 can inform a Mobile Switching Center (MSC) of a circuit-switched communication network, wherein the MSC sends a packet-switched to circuit-switched handover response to the MME system 120, including handover command information for the UE 101 to access a circuit-switched network facility.

In some examples, the UE 101 includes only a single radio transceiver component and can operate on only a single radio frequency band. In this example, the UE 101 transfers a SRVCC message to the wireless communication system. In this example, processing the VoLTE performance metrics comprises processing VoLTE SRVCC performance metrics to determine if the VoLTE SRVCC service should be disabled on the LTE BS, and transferring the reject message comprises transferring the reject message if the VoLTE SRVCC service on the LTE BS should be disabled, if the QCI value indicates a VoLTE session, and if the UE comprises an SRVCC UE.

In some examples, processing the VoLTE performance metrics comprises processing the VoLTE SRVCC performance metrics for a plurality of radio frequency bands to determine if the VoLTE SRVCC service on one of the radio frequency bands on the LTE BS should be disabled, and transferring the reject message comprises transferring the reject message if the VoLTE SRVCC service on the one of the radio frequency bands on the LTE BS should be disabled, if the QCI value indicates a VoLTE session, if the VoLTE session is on the one of the radio frequency bands, and if the UE comprises an SRVCC UE.

In some examples, processing the VoLTE performance metrics comprises processing radio frequency noise data transferred by the LTE BS to determine if the VoLTE service on the LTE BS should be disabled. In some examples, processing the VoLTE performance metrics comprises processing blocked call data and dropped call data transferred by the LTE BS to determine if the VoLTE service on the LTE BS should be disabled. In some examples, processing the VoLTE performance metrics comprises processing a processing capacity data and a buffer status data transferred by the LTE BS to determine if the VoLTE service on the LTE BS should be disabled.

In some examples, if the VoLTE service on the LTE BS should be disabled and if the QCI value indicates the VoLTE session, then the MME system transfers a voice session message for the UE for delivery to the different BS. In some examples, if the VoLTE service on the LTE BS should be disabled and if the QCI value indicates the VoLTE session, then the MME system transfers a bearer reject message indicating a session transfer for delivery to the S-GW.

Figure 2:
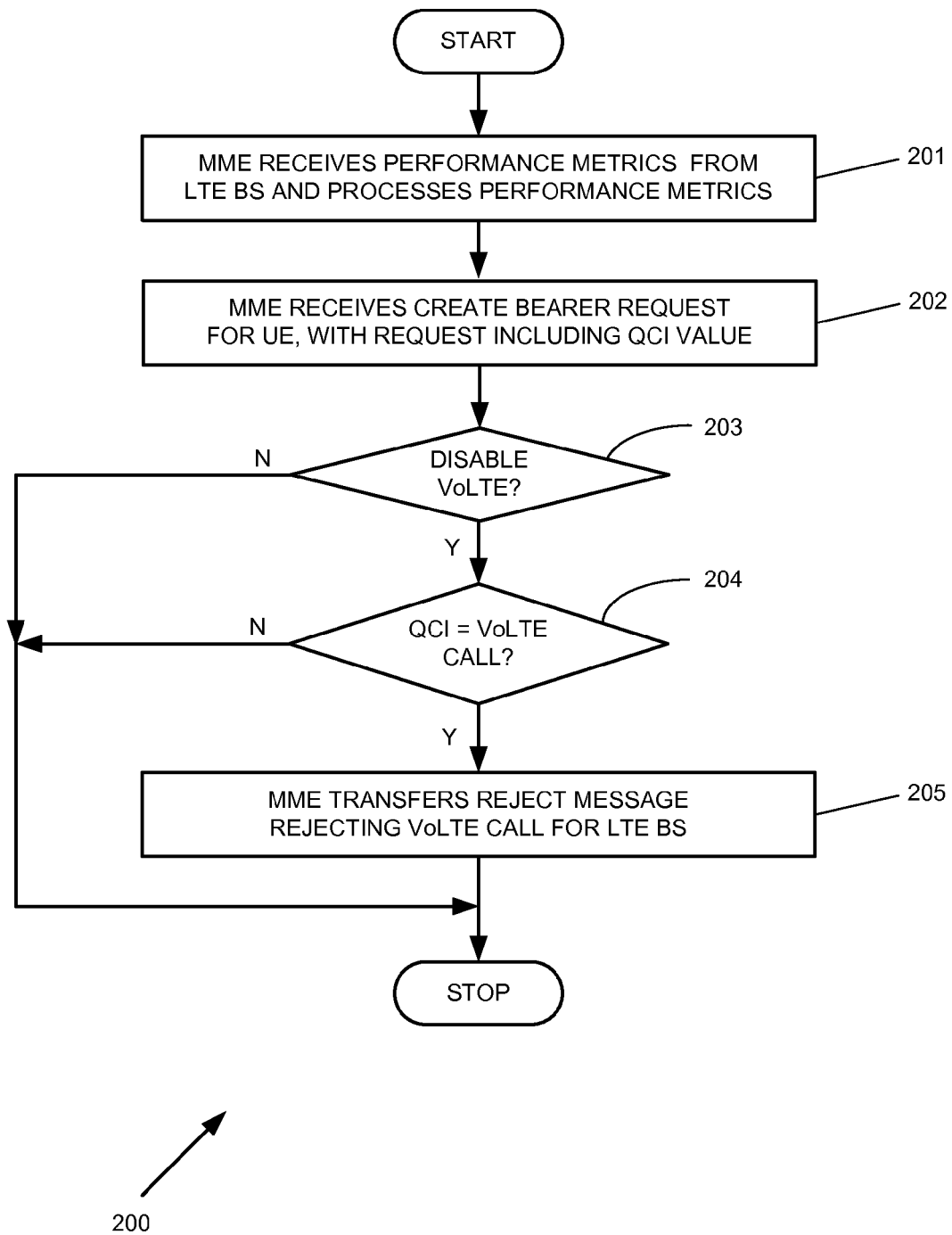
FIG. 2 illustrates a flowchart of a method operating a LTE system to disable VoLTE service of an LTE BS.

FIG. 2 illustrates a flowchart 200 of a method operating a LTE system to disable VoLTE service of an LTE BS. In step 201, an MME system receives performance metrics from the BS and processes the performance metrics. The performance metrics comprise VoLTE performance metrics of the BS. The processing includes the MME system assessing the performance of the BS in conducting (or potentially conducting) VoLTE calls. The performance metrics can be compared to acceptable threshold values by the MME system, for example.

In step 202, the MME system receives a create bearer request for a UE. The create bearer request could comprise a data communications request or could comprise a voice communications request. In an LTE communications network, the create bearer request could comprises a voice communication bearer request where the voice communication will need to be transferred via a VoLTE bearer.

In step 203, the MME system determines whether the call should be refused (i.e., whether VoLTE capability should be disabled for the call). The MME system refuses the call if the performance metrics are processed to indicate that the BS cannot properly conduct a VoLTE call. If the MME system determines that the BS cannot properly conduct a VoLTE call, then the method proceeds to step 204. Otherwise, the method exits (i.e., the VoLTE call proceeds normally).

In step 204, the MME system determines whether the create bearer request is for a VoLTE call. If the create bearer request is for a VoLTE call, then the method proceeds to step 205. Otherwise, the method exits.

In step 205, the MME system generates and transfers a reject message that rejects the VoLTE call for the BS. The reject message is transferred by the MME system to the BS and to the UE. The reject message disables VoLTE for the LTE BS at the current time. In addition, the reject message may be transferred to other communication system/wireless communication network components as needed.

In some examples, the default VoLTE bearer can be torn down. However, it should be understood that alternatively the default VoLTE bearer can be maintained, as communication conditions for the BS can later change and therefore the default VoLTE bearer may be available and in condition for use later in time.

In some examples, a subsequent create bearer request can determine if VoLTE service is to be used or not used. In this example, the MME system receives additional VoLTE performance metrics that characterize the VoLTE quality of the LTE BS, the MME system processes the additional VoLTE performance metrics to determine if the VoLTE service on the LTE BS should be enabled, the MME system receives another create bearer request for another UE transferred by the S-GW, and the MME system, if the VoLTE service on the LTE BS should be enabled and if a QCI value indicates another VoLTE session, then transfers a create bearer acknowledgement for delivery to the S-GW.

Figure 3:
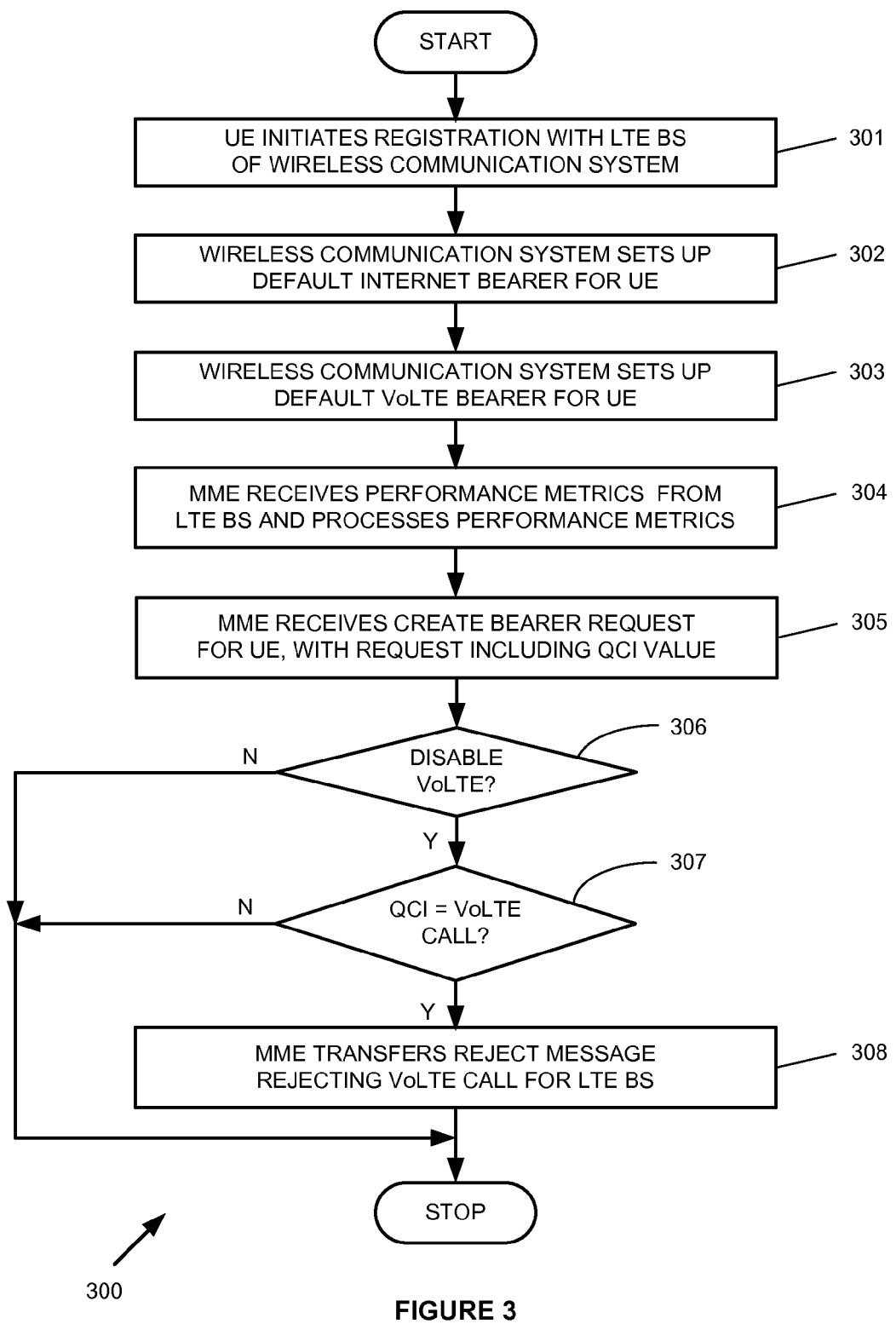
FIG. 3 illustrates a flowchart of a method operating a LTE system to disable VoLTE service of an LTE BS.

FIG. 3 illustrates a flowchart 300 of a method operating a LTE system to disable VoLTE service of an LTE BS. In step 301, a UE initiates registration with a BS of a wireless communication system.

In step 302, the MME system of the wireless communication system sets up a default Internet bearer for the UE. The default Internet bearer can be used for exchanging data communications. The UE can subsequently exchange packetized data communications with the wireless communication system.

In step 303, the MME system sets up a default VoLTE bearer for the UE. The default VoLTE bearer can be used for exchanging VoLTE voice calls.

In step 304, an MME system receives performance metrics from the BS and processes the performance metrics. The performance metrics comprise VoLTE performance metrics of the BS. The processing includes the MME system assessing the performance of the BS in conducting (or potentially conducting) VoLTE calls. The performance metrics can be compared to acceptable threshold values by the MME system, for example.

In step 305, the MME system receives a create bearer request for a UE. The create bearer request could comprise a data communications request or could comprise a voice communications request. In an LTE communications network, the create bearer request could comprises a voice communication bearer request where the voice communication will need to be transferred via a VoLTE bearer.

In step 306, the MME system determines whether the call should be refused. The MME system refuses the call if the performance metrics are processed to indicate that the BS cannot properly conduct a VoLTE call. If the MME system determines that the BS cannot properly conduct a VoLTE call, then the method proceeds to step 307. Otherwise, the method exits (i.e., the VoLTE call proceeds normally).

In step 307, the MME system determines whether the create bearer request is for a VoLTE call. If the create bearer request is for a VoLTE call, then the method proceeds to step 308. Otherwise, the method exits.

In step 308, the MME system generates and transfers a reject message that rejects the VoLTE call for the BS. The reject message is transferred by the MME system to the BS and to the UE. The reject message disables VoLTE for the LTE BS at the current time. In addition, the reject message may be transferred to other communication system/wireless communication network components as needed.

Figure 4:
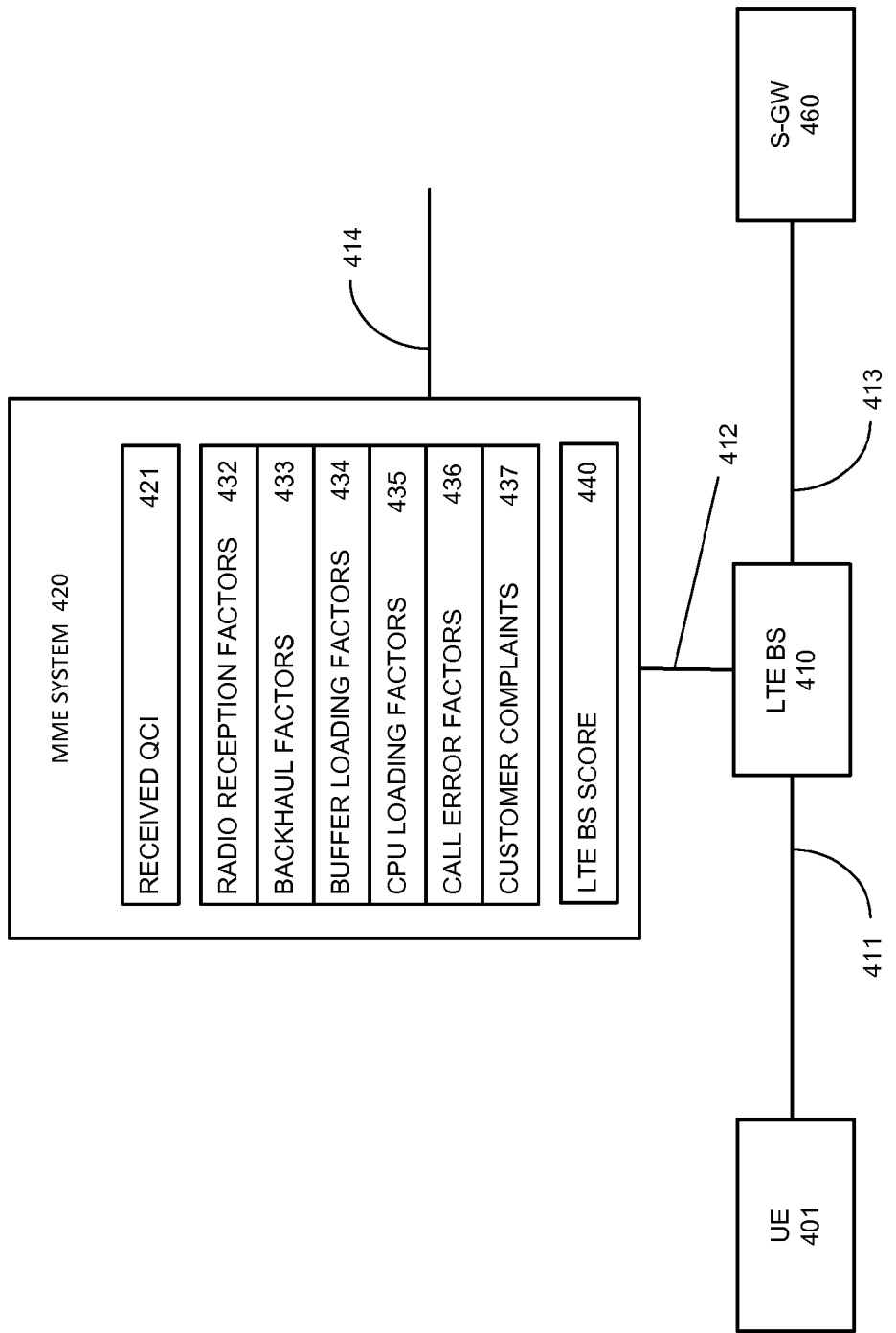
FIG. 4 illustrates a MME system to disable VoLTE service of a BS.

FIG. 4 illustrates a MME system 420 to disable VoLTE service of a LTE BS 410. The MME system 420 is an example of the system 120, although the system may use alternative configurations and operations. The MME system 420 is a component of or interacts with a wireless communication system 400. The wireless communication system 400 further includes the LTE BS 410 coupled to the MME system 420 and a S-GW 460 coupled to the LTE BS 410. The LTE BS 410 comprises a LTE BS or includes a LTS BS capability. It should be understood that the wireless communication system 400 can include further components that are not shown for clarity.

The MME system 420 is coupled to the LTE BS 410 by a S1 signaling link 412. The S-GW 460 is coupled to the LTE BS 410 by a S1 signaling link 413. The MME system 420 in some examples is coupled to other communication network components of the communication network 400 by a link 414. For example, the MME system 420 consults a HSS during a UE registration.

The MME system 420 receives a plurality of performance metrics from the LTE BS 410. The MME system 420 in the example receives radio reception factors 432, backhaul factors 433, buffer loading factors 434, CPU loading factors 435, call error factors 436, and customer complaints 437. Other or additional performance metrics are contemplated and are within the scope of the description and claims.

The radio reception factors 432 include factors such as a received signal strength at the BS 410, a level of noise at the BS LTE 410, a level of interference at the LTE BS 410, a level of communications latency at the LTE BS 410. The backhaul factors 433 include factors such as a level of backhaul congestion and a level of backhaul latency. The buffer loading factors 433 include factors such as a level of buffer loading of transmit and/or receive buffers in the LTE BS 410 and a level of buffer latency. The CPU loading factors 434 include factors such as a level of CPU loading of the CPU in the LTE BS 410 and a level of CPU latency. The call error factors 436 include factors such as a number of dropped calls for the LTE BS 410 and a number of blocked calls for the LTE BS 410. The customer complaints 437 include a quantization of customer complaints received for the LTE BS 410.

The MME system 420 processes the plurality of performance metrics to generate a BS score 440 for the LTE BS 410. The BS score 440 is representative of the plurality of performance metrics. The plurality of performance metrics can be processed in various ways to generate the BS score 440. In one example, the MME system 420 generates a sum or a weighted sum of the plurality of performance metrics. In another example, the MME system 420 generates an average or weighted average of the plurality of performance metrics. However, it should be understood that other suitable mathematical or statistical quantifications can be used to generate the BS score 440 from the plurality of performance metrics.

The MME system 420 uses the BS score 440 to determine whether the LTE BS 410 is operating within acceptable parameters. The MME system 420 uses the BS score 440 to determine whether the LTE BS 410 is operating within acceptable parameters for conducting VoLTE voice calls.

The MME system 420 obtains a QCI value 421 for communications to be exchanged between the UE 101 and the wireless communication system 400. The MME system 420 is configured to receive a QCI value and determine whether the received QCI 421 for a particular communication comprises a QCI value corresponding to a VoLTE call initiated by the UE 401. If the received QCI 421 is a value of one, then the corresponding communication comprises a VoLTE call. If the received QCI 421 is a value of one, then the MME system 420 must verify whether the LTE BS 410 has adequate performance to handle a VoLTE call.

In some examples, the MME system 420 is configured to receive a plurality of performance metrics that characterize VoLTE quality of the LTE BS 410, with the plurality of performance metrics comprising radio reception factors 432, backhaul factors 433, buffer loading factors 434, CPU loading factors 435, call error factors 436, and customer complaints 437, process the plurality of performance metrics to generate a BS score 440, receive a create bearer request for a UE 401 transferred by a S-GW 460 and comprising a QCI value 421, and if the BS score 440 is greater than a predetermined threshold and if the QCI value 421 indicates a VoLTE session, then transfer a reject message for delivery to the UE 401 instructing the UE 401 to use a different BS for voice.

Figure 5:
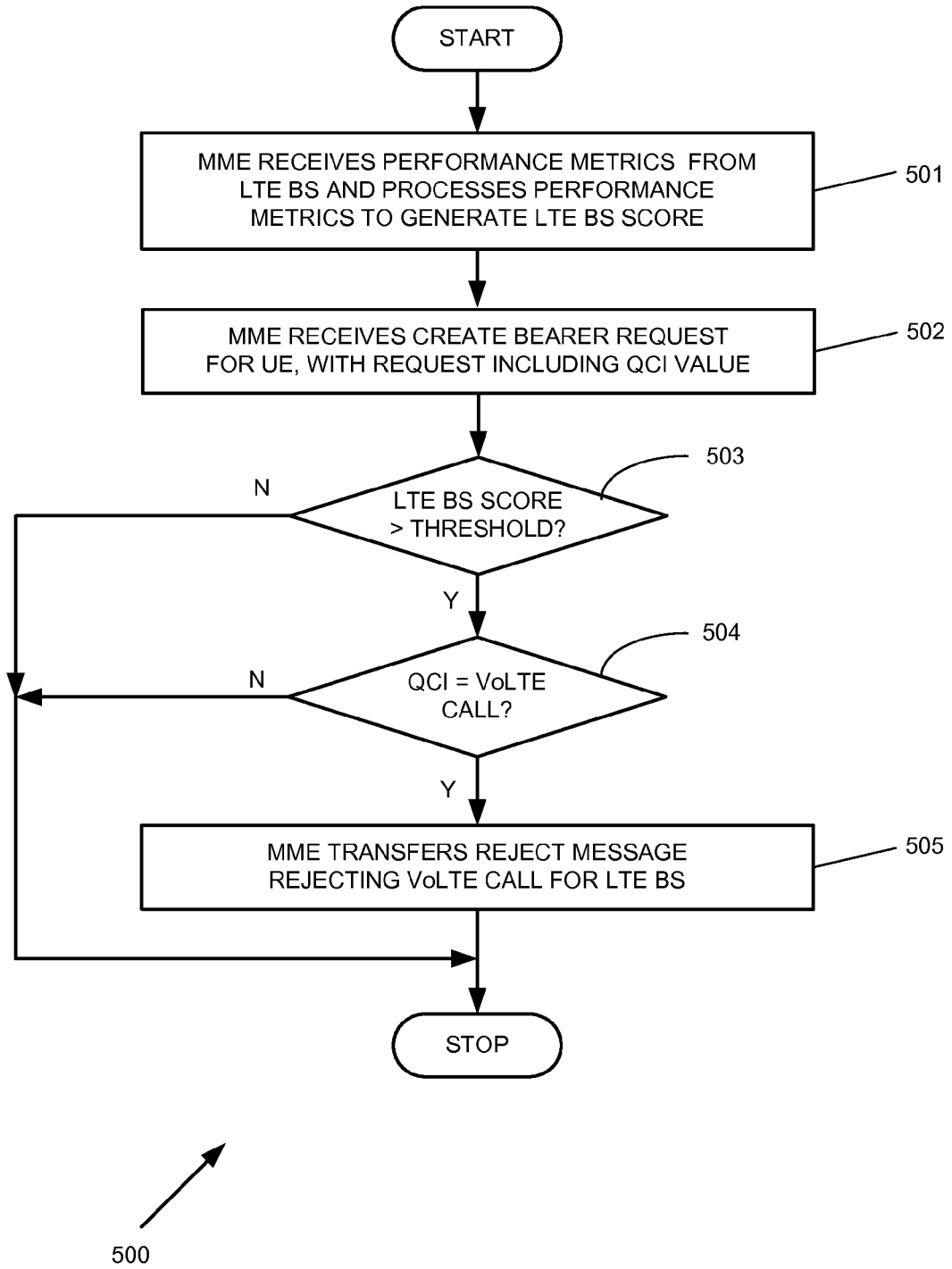
FIG. 5 illustrates a flowchart of a method operating a LTE system to disable VoLTE service of an LTE BS.

FIG. 5 illustrates a flowchart 500 of a method operating a LTE system to disable VoLTE service of an LTE BS. In step 501, an MME system receives a plurality of performance metrics from the BS and processes the plurality of performance metrics to generate a BS score. The plurality of performance metrics comprise VoLTE performance metrics of the LTE BS, including radio reception factors, backhaul factors, buffer loading factors, CPU loading factors, call error factors, and customer complaints. The plurality of performance metrics are processed to generate the BS score, as previously discussed.

In step 502, the MME system receives a create bearer request for a UE. The create bearer request could comprise a data communications request or could comprise a voice communications request. In an LTE communications network, the create bearer request could comprise a voice communication bearer request where the voice communication will be transferred via a VoLTE bearer.

In step 503, the MME system determines whether the call should be refused. The MME system refuses the call if the BS score indicates that the BS cannot properly conduct a VoLTE call. If the BS score is greater than a predetermined threshold then the BS cannot properly conduct a VoLTE call, as previously discussed. If the MME system determines that the BS cannot properly conduct a VoLTE call, then the method proceeds to step 504. Otherwise, the method exits (i.e., the VoLTE call proceeds normally).

In step 504, the MME system determines whether the create bearer request is for a VoLTE call. If the create bearer request is for a VoLTE call, then the method proceeds to step 505. Otherwise, the method exits.

In step 505, the MME system generates and transfers a reject message that rejects the VoLTE call for the BS. The reject message is transferred by the MME system to the BS and to the UE. The reject message disables VoLTE for the LTE BS at the current time. In addition, the reject message may be transferred to other communication system/wireless communication network components as needed.

Figure 6:
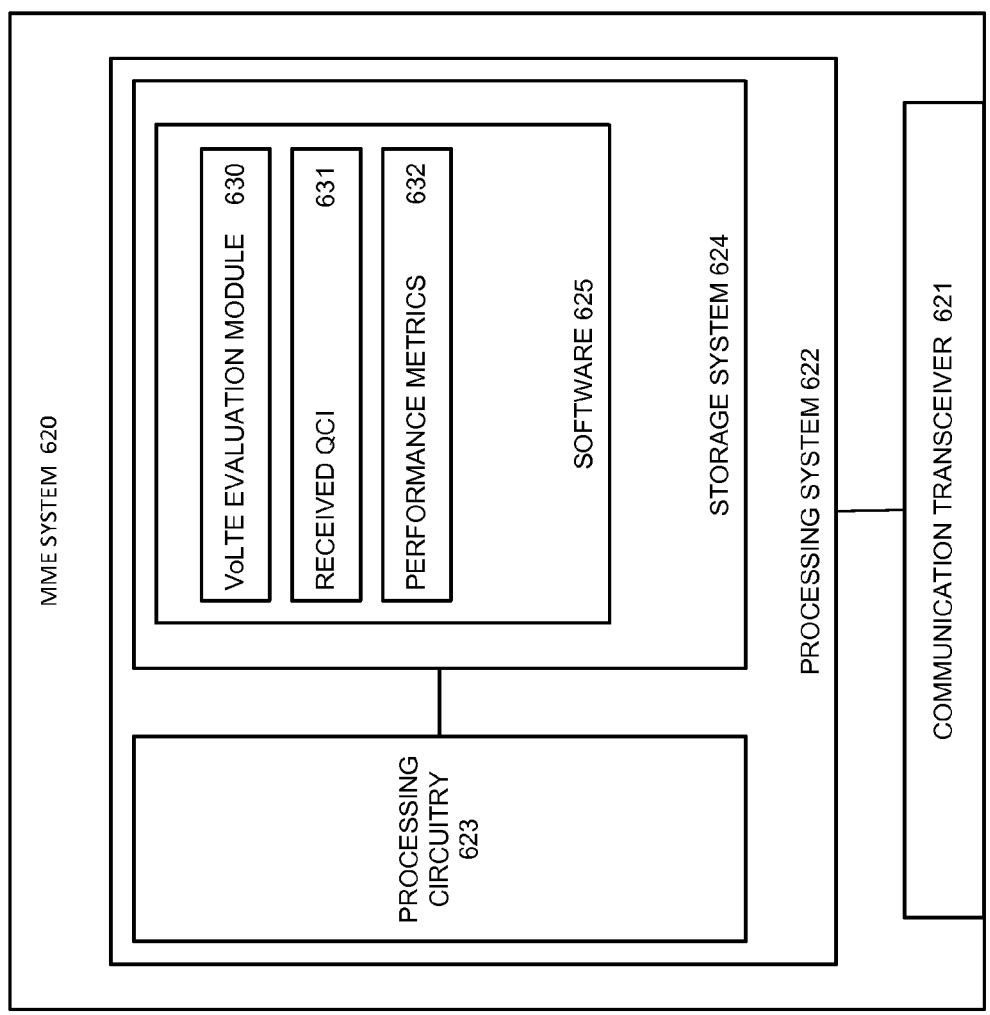
FIG. 6 illustrates a MME system to disable VoLTE service of a BS.

FIG. 6 illustrates a MME system 620 to disable VoLTE service of a BS. The MME system 620 is an example of the system 120 or 140, although these systems may use alternative configurations and operations. The MME system 620 comprises a processing system 622 coupled to a communication transceiver 621. The processing system 622 comprises processing circuitry 623 and a storage system 624. The storage system 624 stores software 625. The software 625 includes software modules 630-632. Some conventional aspects of the MME system 620 are omitted for clarity, such as power supplies, enclosures, and the like.

In the processing system 622, the processing circuitry 623 comprises circuit boards, integrated circuitry, and associated electronics. The storage system 624 comprises non-transitory, machine-readable, data storage media, such as flash drives, disc drives, memory circuitry, servers, and the like. The software 625 comprises machine-readable instructions that control the operation of the processing circuitry 623 when executed. The software 625 includes the software modules 630-632 comprising a VoLTE evaluation module 630, a received QCI 631, and performance metrics 632. The software 625 may also include operating systems, applications, utilities, databases, and the like. All or portions of the software 625 may be externally stored on one or more storage media, such as flash drives, discs, servers, and the like.

When executed by the processing circuitry 623, the VoLTE evaluation module 630 directs the processing circuitry 623 to receive performance metrics 632 that characterize VoLTE quality of a BS, process the performance metrics 632 to determine if the VoLTE service on the BS should be disabled, receive a create bearer request for a UE transferred by a S-GW and comprising a QCI value 631, and if the VoLTE service on the BS should be disabled and if the received QCI value 631 indicates a VoLTE session, then transfer a reject message for delivery to the UE instructing the UE to use a different BS for voice service. The reject message disables VoLTE for the LTE BS at the current time.

The received QCI 631 comprises a QCI value for a received call or communication. The performance metrics 632 comprise one or more performance metrics of a LTE BS 110 or 410 being monitored by the MME system 620.

The communication transceiver 621 comprises communication components, such as ports, signal processing circuitry, memory, software, and the like. The communication transceiver 621 transfers the received QCI 631 and the performance metrics 632 into the MME system 620. The communication transceiver 621 transfers a reject message for delivery to the UE instructing the UE to use a different base station for voice service. The reject message is communicated to the BS and to the UE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) system to disable Voice over LTE (VoLTE) service of a radio frequency band on a LTE base station (BS), the method comprising:
   in a Mobility Management Entity (MME) system, receiving VoLTE performance metrics that characterize VoLTE quality of a plurality of radio frequency bands on the LTE BS;
   in the MME system, processing the VoLTE performance metrics to determine if the VoLTE service on one of the radio frequency bands on the LTE BS should be disabled;
   in the MME system, receiving a create bearer request for a User Equipment (UE) transferred by a Serving Gateway (S-GW) and comprising a Quality-of-Service Class Identifier (QCI) value; and
   in the MME system, if the VoLTE service on one of the radio frequency bands on the LTE BS should be disabled, if the QCI value indicates a VoLTE session, and if the VoLTE session is on the one of the radio frequency bands, then transferring a reject message for delivery to the UE instructing the UE to use a different radio frequency band on the LTE BS for voice service.

2. The method of claim 1 wherein:
   processing the VoLTE performance metrics comprises processing blocked call data transferred by the LTE BS for the plurality of radio frequency bands to determine if the VoLTE service on one of the radio frequency bands on the LTE BS should be disabled.

3. The method of claim 1 wherein:
   processing the VoLTE performance metrics comprises processing capacity data transferred by the LTE BS for the plurality of radio frequency bands to determine if the VoLTE service on one of the radio frequency bands on the LTE BS should be disabled.

4. The method of claim 1 wherein:
   processing the VoLTE performance metrics comprises processing VoLTE Single Radio Voice Call Continuity (SRVCC) performance metrics for the plurality of radio frequency bands to determine if the VoLTE SRVCC service on one of the radio frequency bands on the LTE BS should be disabled; and
   transferring the reject message comprises transferring the reject message if the VoLTE SRVCC service on the one of the radio frequency bands on the LTE BS should be disabled, if the QCI value indicates a VoLTE session, if the VoLTE session is on the one of the radio frequency bands, and if the UE comprises an SRVCC UE.

5. The method of claim 1 wherein processing the VoLTE performance metrics comprises processing radio frequency noise data transferred by the LTE BS for the plurality of radio frequency bands to determine if the VoLTE service on one of the radio frequency bands on the LTE BS should be disabled.

6. The method of claim 1 wherein processing the VoLTE performance metrics comprises processing dropped call data transferred by the LTE BS for the plurality of radio frequency bands to determine if the VoLTE service on one of the radio frequency bands on the LTE BS should be disabled.

7. The method of claim 1 wherein processing the VoLTE performance metrics comprises processing buffer status data transferred by the LTE BS for the plurality of radio frequency bands to determine if the VoLTE service on one of the radio frequency bands on the LTE BS should be disabled.

8. The method of claim 1 further comprising, in the MME system, if the VoLTE service on the one of the radio frequency bands on the LTE BS should be disabled, if the QCI value indicates the VoLTE session, and if the VoLTE session is on the one of the radio frequency bands, then transferring a voice session message for the UE for delivery to the different radio frequency band on the LTE BS.

9. The method of claim 1 further comprising, in the MME system, if the VoLTE service on the one of the radio frequency bands on the LTE BS should be disabled, if the QCI value indicates the VoLTE session, and if the VoLTE session is on the one of the radio frequency bands, then transferring a bearer reject message indicating a session transfer for delivery to the S-GW.

10. The method of claim 1 further comprising:
    in the MME system, receiving additional VoLTE performance metrics that characterize the VoLTE quality of the plurality of the radio frequency bands on the LTE BS;
    in the MME system, processing the additional VoLTE performance metrics to determine if the VoLTE service on the one of the radio frequency bands on the LTE BS should be enabled;
    in the MME system, receiving another create bearer request for another UE transferred by the S-GW; and
    in the MME system, if the VoLTE service on the one of the radio frequency bands on the LTE BS should be enabled and if a QCI value indicates another VoLTE session, then transferring a create bearer acknowledgement for delivery to the S-GW.

11. A Mobility Management Entity (MME) system to disable Voice over LTE (VoLTE) service of a radio frequency band on a Long Term Evolution (LTE) base station (BS), the system comprising:
    a data communication interface configured to receive VoLTE performance metrics that characterize VoLTE quality for a plurality of radio frequency bands on the LTE BS and transmit and receive signaling messages over a communication network; and a processing system configured to process the VoLTE performance metrics obtained through the data communication interface to determine if VoLTE service on one of the radio frequency bands on the LTE BS should be disabled, and if VoLTE should be disabled on one of the radio frequency bands on the LTE BS, if a create bearer request obtained through the data communication interface has a Quality-of-Service Class Identifier (QCI) value indicating a VoLTE session for a UE, and if the VoLTE session is on the one of the radio frequency bands, then transfer a reject message for delivery to the UE instructing the UE to use a different radio frequency band on the LTE BS for voice service.

12. The MME system of claim 11 wherein:
the processing system configured to process the VoLTE performance metrics comprises the processing system configured to process blocked call data transferred by the LTE BS for the plurality of radio frequency bands to determine if the VoLTE service on one of the radio frequency bands on the LTE BS should be disabled.

13. The MME system of claim 11 wherein:
the processing system configured to process the VoLTE performance metrics comprises the processing system configured to process capacity data transferred by the LTE BS for the plurality of radio frequency bands to determine if the VoLTE service on one of the radio frequency bands on the LTE BS should be disabled.

14. The MME system of claim 11 wherein:
the processing system configured to process the VoLTE performance metrics comprises the processing system configured to process VoLTE Single Radio Voice Call Continuity (SRVCC) performance metrics for the plurality of radio frequency bands to determine if the VoLTE SRVCC service on one of the radio frequency bands on the LTE BS should be disabled; and
the processing system configured to transfer the reject message comprises the processing system configured to transfer the reject message if the VoLTE SRVCC service on the one of the radio frequency bands on the LTE BS should be disabled, if the QCI value indicates a VoLTE session, if the VoLTE session is on the one of the radio frequency bands, and if the UE comprises an SRVCC UE.

15. The MME system of claim 11 wherein the processing system configured to process the VoLTE performance metrics comprises the processing system configured to process radio frequency noise data transferred by the LTE BS for the plurality of radio frequency bands to determine if the VoLTE service on one of the radio frequency bands on the LTE BS should be disabled.

16. The MME system of claim 11 wherein the processing system configured to process the VoLTE performance metrics comprises the processing system configured to process dropped call data transferred by the LTE BS for the plurality of radio frequency bands to determine if the VoLTE service on one of the radio frequency bands on the LTE BS should be disabled.

17. The MME system of claim 11 wherein the processing system configured to process the VoLTE performance metrics comprises the processing system configured to process a processing buffer status data transferred by the LTE BS for the plurality of radio frequency bands to determine if the VoLTE service on one of the radio frequency bands on the LTE BS should be disabled.

18. The MME system of claim 11 wherein the processing system is further configured to, if the VoLTE service on the one of the radio frequency bands on the LTE BS should be disabled, if the QCI value indicates the VoLTE session, and if the VoLTE session is on the one of the radio frequency bands, then transfer a voice session message for the UE for delivery to the different radio frequency band on the LTE BS.

19. The MME system of claim 11 wherein the processing system is further configured to, if the VoLTE service on the one of the radio frequency bands on the LTE BS should be disabled, if the QCI value indicates the VoLTE session, and if the VoLTE session is on the one of the radio frequency bands, then transfer a bearer reject message indicating a session transfer for delivery to an S-GW of the UE.

20. The MME system of claim 11 wherein the processing system is further configured to process additional VoLTE performance metrics obtained through the data communication interface to determine if VoLTE service on the one of the radio frequency bands on the LTE BS should be enabled, and if VoLTE should be enabled on the one of the radio frequency bands on the LTE BS and if a create bearer request obtained through the data communication interface has a QCI value indicating a VoLTE session for another UE, transfer a create bearer acknowledgement for delivery to an S-GW of the other UE.

* * * * *